United States Patent
Alexndrov

[11] Patent Number: 5,508,903
[45] Date of Patent: Apr. 16, 1996

[54] INTERLEAVED DC TO DC FLYBACK CONVERTERS WITH REDUCED CURRENT AND VOLTAGE STRESSES

[76] Inventor: Felix Alexndrov, 200 Bedford Rd., #15C, Wobuzu, Mass. 01801-3929

[21] Appl. No.: 426,093

[22] Filed: Apr. 21, 1995

[51] Int. Cl.⁶ .................................................. H02M 3/335
[52] U.S. Cl. ................................................. 363/16; 363/71
[58] Field of Search .............................. 363/16, 20–26, 363/65, 71, 120, 121, 123, 131, 133, 134

[56] References Cited

U.S. PATENT DOCUMENTS

| | | | |
|---|---|---|---|
| 4,408,267 | 10/1983 | Pruitt | 363/17 |
| 4,423,476 | 12/1983 | Neumann | 363/20 |
| 4,500,949 | 2/1985 | Prete | 363/28 |
| 4,607,319 | 8/1986 | Assow et al. | 363/20 |
| 4,618,919 | 10/1986 | Martin | 363/21 |
| 4,641,229 | 2/1987 | Easter | 363/21 |
| 4,959,764 | 9/1990 | Bassett | 363/16 |
| 5,008,795 | 4/1991 | Parsley et al. | 363/71 |
| 5,038,263 | 8/1991 | Mazzezo et al. | 363/20 |
| 5,132,888 | 7/1992 | Lo et al. | 363/17 |
| 5,132,889 | 7/1992 | Hitchcock et al. | 363/17 |
| 5,146,394 | 9/1992 | Ishii et al. | 363/16 |
| 5,402,329 | 3/1995 | Wittenbreder, Jr. | 363/16 |
| 5,434,768 | 7/1995 | Jitaru et al. | 363/21 |

OTHER PUBLICATIONS

R. Watson, G. C. Hua, and F. C. Lee, Characterization of an Active Clamp Flyback Topology for Power Factor Correction Applications 1994 IEEE APEC Proceedings, pp. 412–418.

Joe Mazzezo, Utilizing Ripple Steering in Forward and Fry Back Converters and Input Filters, 1995 HFPC Proceedings, pp. 158–182.

*Primary Examiner*—Matthew V. Nguyen
*Attorney, Agent, or Firm*—Alexander D. Rabinovich

[57] ABSTRACT

Interleaved flyback DC to DC converters are provided comprising a first and a second switching transistors controllable with 180° phase shift and a first and a second flyback transformers. A primary winding of each transformer is coupled in a series circuit with the corresponding switching transistor. A secondary winding of the first transformer is coupled with the secondary winding of the second transformer via a first catch diode and both said secondary windings are coupled to an output filter capacitor via a second and a third catch diode, correspondingly. When discharging to the output filter capacitor, the transformers interlock each other. By interlocking, non-pulsating output current is generated and voltage across switching transistors is reduced. A secondary quasi-resonant snubber network relieves voltage spikes across the switching transistors. A common magnetic core of the transformers cuts the cost and the size of the interleaved flyback converters.

15 Claims, 5 Drawing Sheets

5,508,903

INTERLEAVED DC TO DC FLYBACK CONVERTERS WITH REDUCED CURRENT AND VOLTAGE STRESSES

BACKGROUND OF THE INVENTION

1. Field of the Invention

This invention relates to DC/DC converters used in AC/DC and DC/DC power supplies, and more particularly, in isolated multioutput power supplies with high output currents and also, in isolated power supplies with power factor correction capability.

2. Description of the Prior Art

Regulated DC/DC converters are commonly classified in one of three topologies: the buck; the boost; and the buck-boost. These converters comprise various arrangements of a switch, a diode, and a capacitor.

FIG. 1A illustrates a non-isolated, single switch buck-boost converter having a transistor switch $SW_1$, an inductor $L_1$, a diode $D_1$, and a capacitor $C_1$.

FIG. 1B illustrates a single output flyback converter having a transistor switch $SW_2$, transformer $T_1$, a catch diode $D_2$, and a capacitor $C_2$. The flyback converter is an isolated version of the buck-boost converter, as the transformer virtually is a coupled inductor. Since transformer primary winding has a leakage inductance, a snubber or clamp network is needed to prevent the transistor switch from a break-down.

The flyback converters are widely used in multioutput power supplies because of their simplicity. These converters do not have a transformer saturation problem. They are also distinguished by unity power factor capability when used in AC/DC power supplies. But these converters suffer significantly from current and voltage stresses that limit the output power.

FIG. 1C illustrates an interleaved flyback converter having two transistor switches $SW_3$ and $SW_4$, two transformers $T_2$ and $T_3$, two catch diodes $D_3$ and $D_4$, and a capacitor $C_3$. The interleaved converter is a parallel combination of two converters of FIG. 1B controlled with a phase shift of 180°. The interleaving reduces input and output current ripple.

The interleaved flyback converters may be also provided with a snubber or clamp network that absorbs voltage spikes generated by leakage inductance of the transformer primary when the switch turns off (see FIG. 1B).

In the interleaved topology of FIG. 1C, the energy of the voltage spikes may be also diminished by a secondary resonance in output LCD network (see U.S. Pat. No. 4,423,476 to Neumann).

FIG. 1D illustrates an active clamp technique in the interleaved flyback converter in accordance with U.S. Pat. No. 4,618,919 to Martin. This converter comprises transformers $T_4$ and $T_5$, output diodes $D_5$ and $D_6$, and switching means $SW_5$ and $SW_6$. A filter capacitor $C_4$ is provided to absorb leakage inductance energy of transformer primaries when turning over the switching means $SW_5$ and $SW_6$. The capacitor $C_4$ at the primary high voltage side of the converter is always coupled with the load $R_L$ on low voltage secondary side through one or both discharging transformers $T_4$ and $T_5$. As a result, a high equivalent output capacitance is achieved. However, a high percentage of converter energy still bounces between the transformers $T_4$ and $T_5$ and the filter capacitor $C_4$.

A simplified single transistor active clamp circuit for an interleaved flyback converter is described by R. Watson, G.C. Hua, and F.C. Lee in the "Characterization of an active clamp topology for power factor correction application", IEEE Applied Power Electronic Conference Proceedings, 1994, pp. 412–418. Single transistor active clamp does not reduce the output current ripple. Also, active clamps used in combination with Zero Voltage Transition (ZVT) technique have been introduced in the flyback topology. An example of such technique is shown in U.S. Pat. No. 5,146,394 to Takuya Ishii et at. Unfortunately, the implementation of two active clamps and ZVT technique in the interleaved flyback converters requires a sophisticated control circuitry and many additional components.

FIG. 2 illustrates a two switch., buck derived push-pull converter comprising transistor switches $SW_7$ and $SW_8$, a transformer $T_6$, diodes $D_7$ and $D_8$, a filter inductor $L_2$, an output capacitor $C_5$, and a primary side control circuit coupled with a current sensor CS. The Control Circuit drives gates $G_7$ and $G_8$ of the transistor switches with a phase shift of 180°. The converter of FIG. 2 has the same number of components as the converter of FIG. 1C and may be considered as a conventional alternative of the latter operating in current continuous mode(CCM) for a single output application. The main disadvantage of converter of FIG. 1C is still a high output current ripple, that limits the output power. Besides that, the voltage across the transistor switches $SW_3$ and $SW_4$ when turning on, is higher, than the same in the converter of FIG. 2. It means higher turn-on losses caused by intrinsic capacitance of these switches.

A disadvantage of all flyback topologies of FIG. 1B, 1C, and 1D is that they feature unlinear transfer function. Another disadvantage that in most energy efficient CCM, the converters have right hand plane zero in its open loop frequency response (see K. Kit. Sum, "Switch Mode Power Conversion—Basic Theory and Design", Marcel Dekker Inc., 1984). When duty ratio of the switching transistors increases, duty ratio of output current pulses charging the output capacitor decreases, that is, average output current has a surge until the amplitude of these pulses will increase with some delay. It means that much more efforts are required to achieve good regulation and closed loop stability. Therefore, there is still a need for improved flyback converters that does not have the shortcomings of the prior art converters.

SUMMARY OF THE INVENTION

In accordance with the invention, interleaved flyback converters are provided maintaining the beneficial features of the isolated buck and flyback converters and avoiding the disadvantages related to both of them. By an appropriate interleaving two flyback power stages, simple circuit topologies are obtained which reduce output current ripple and voltage stresses, cut switching losses and improve transfer characteristics. By integrating of flyback transformers in a common unit, the reduced size and cost of magnetic elements may be achieved.

The present invention may be embodied in converters for low or high output voltage and for single or multioutput applications. Since the switching transistors in these converters operate with duty ratio below 50% and the transfer function of the converters is linear, a variety of full wave controllers may be successfully used with these topologies.

Further objects, features and advantages of the invention will be apparent from the followed detailed description when taken in conjunction with the accompanying drawings.

DETAILED DESCRIPTION OF THE INVENTION

Interleaved DC to DC flyback converters with reduced current and voltage stresses according to the present invention will be explained in detail with reference to accompanying drawings.

Figure 3A:
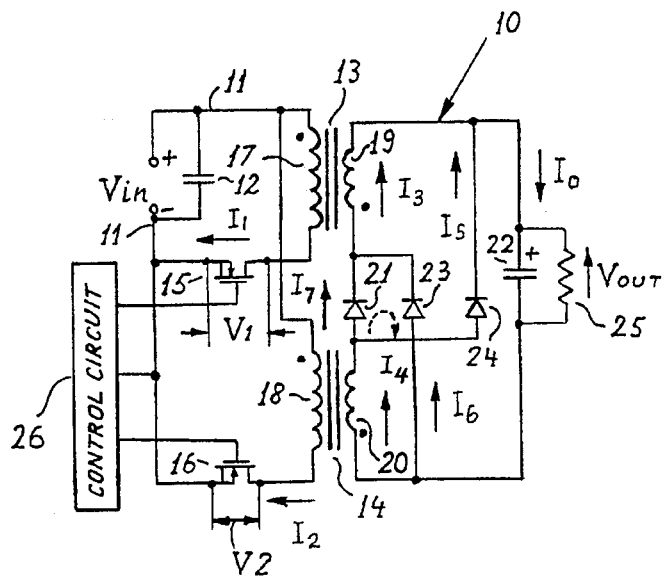
FIG. 3A illustrates a schematic diagram of an interleaved flyback converter according to the first embodiment of the present invention.

The first embodiment of the invention is shown in FIG. 3A. A DC voltage $V_{in}$ is applied to the input of the converter 10 through DC supply lines 11. An input capacitor 12 of the converter 10 is connected in parallel to converter power stages comprising a first and a second flyback transformers 13 and 14 and also, a first and a second switching transistors 15 and 16 correspondingly. The transformers 13 and 14 are provided with primary windings 17, 18 and secondary windings 19, 20, correspondingly, each winding having a first terminal (indicated with a dot) and a second terminal (without a dot). Each of the switching transistors 15 and 16 is coupled in a series circuit with the primary windings 17 and 18, respectively, and these series circuits are connected in parallel to the input capacitor 12. The switching transistors 15 and 16 are controlled with a 180° phase shift and with a predetermined duty ratio for providing a regulated energy flow. A first catch diode 21 is connected between the first (dotted) terminal of the secondary winding 19 and the second terminal of the secondary winding 20, aiding each other. An output filter capacitor 22 is coupled with the second terminal of the secondary winding 19 and the first terminal of the secondary winding 20. A second catch diode 23 is connected between first terminals of the secondary windings 19 and 20 and a third catch diode 24 is connected between the second terminals of these windings, providing a path for the discharge currents from transformers 13 and 14 to the filter capacitor 22 and a load 25 connected across the capacitor 22. A control circuit 26 drives the transistor switches 15 and 16.

Figure 3B:
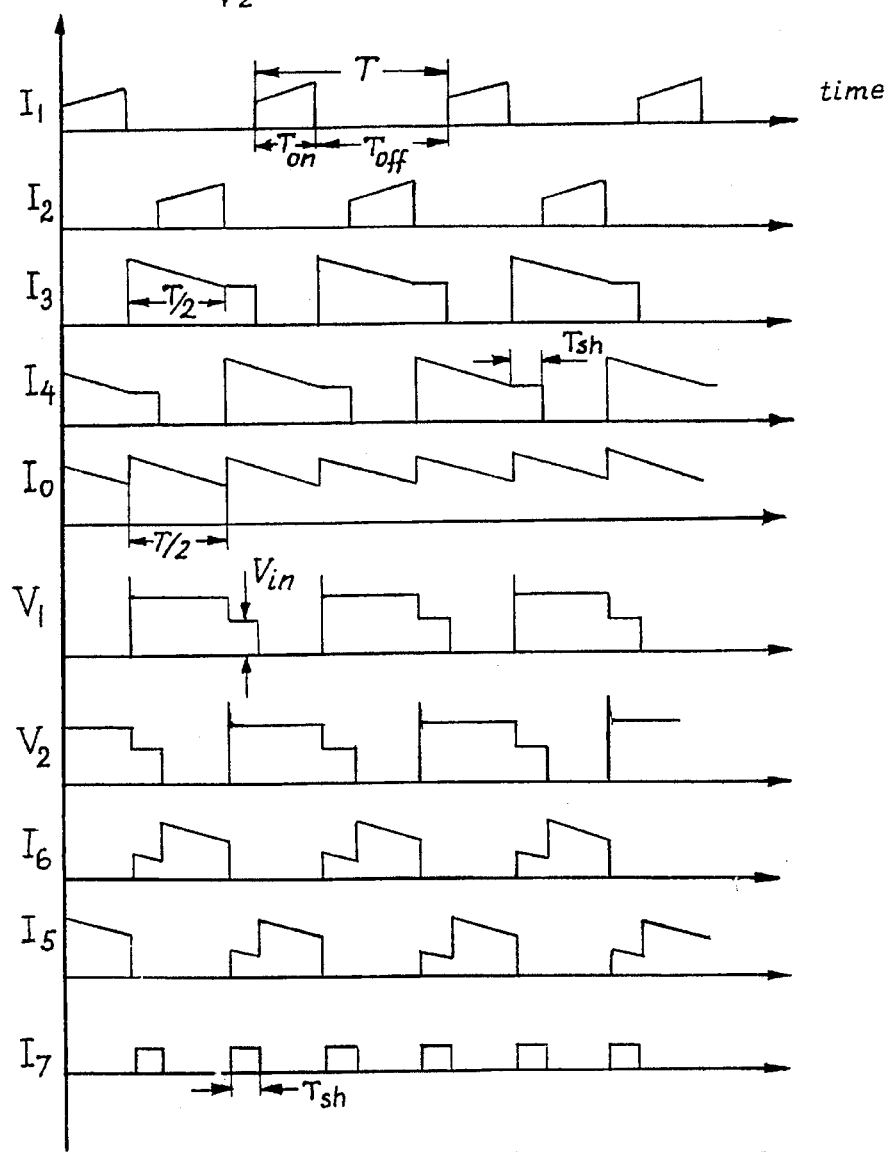
FIG. 3B illustrates waveforms in the converter of FIG. 3A.

In FIG. 3B, $I_1$ and $I_2$ designate currents in primary windings 17 and 18 of the transformers 13 and 14 in the CCM of the converter 10. These currents are formed in the process of linear charging of the transformers via the primary windings. I3 and I4 designate relative currents in secondary windings 19 and 20 of these transformers, and $I_0$ designates a low ripple DC current flowing to the output filter capacitor 22 and the load 25. These currents are formed in a process of linear discharging of the transformers via the secondary windings 19 and 20.

Reduced ripple of the current $I_0$ is explained by a mode of operation inherently featuring the proposed topologies, wherein two flyback transformers are successively discharged with 50% duty ratio. This operation is best understood by analyzing as follows. In converter 10 of FIG. 3A, when, for instance, the transistor 15 turns off (an interval $T_{off}$), the secondary winding 19 of the first transformer 13 generates a current $I_6$ flowing via the diode 23 to the load 25. Since in the beginning of this interval the current $I_3$ in the winding 19 exceeds the current 14 in the winding 20, the latter is shorted via the conductive diodes 21 and 23. The short time interval $T_{sh}$ is defined as $T_{sh}=T_{off}-T/2$, where T is a period. Likewise, the secondary winding 19 of the first transformer 13 has short time intervals with 180° phase shift. When not shorted, the secondary windings 19 and 20 generate a resulting current $I_0$ to the output filter capacitor 22 and the load 25.

The transfer function of the converter 10 is easily derived taking into account that in order to maintain flux balance under steady-state conditions, the volt-second product impressed on the primary winding 17 during a period T must be equal to zero, that is:

$$V_{in} \times T_{on} = V_{out} \times N_2/N_1 \times T/2 \tag{1}$$

Figure 2:
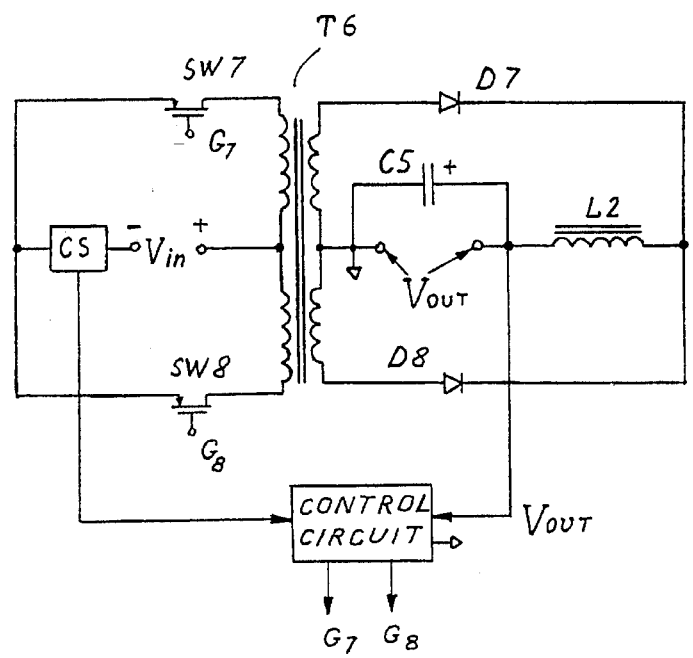
FIG. 2 (prior art) illustrates a schematic diagram of a push-pull converter.

For the purpose of simplification, the voltage drops across transistors, diodes, in copper and also, voltage ripple across the capacitor 22 are neglected. Thus, the output voltage is given by:

$$V_{out} = 2V_{in} \times N_2/N_1 \times T_{on}/T = 2V_{in} \times D \times N_2/N_1, \tag{2}$$

where $D=T_{on}/T$ is duty ratio of the switching transistor 15 or 16, $N_1$ is number of turns of the primary winding 17 or 18, and $N_2$ is number of turns of the secondary winding 19 or 20. Thus, the voltage transfer function of the converter of FIG. 3A is linear and the same as that of the push-pull converter of FIG. 2.

During regulation, when the duty ratio D of the switching transistors 15 and 16 of the converter 10 of FIG. 3A is changed, for instance, is raised, the short time intervals $T_{sh}$ decrease, but there is no dynamic drop of the average $I_0$ current. Therefore, the converter has no right hand plane zero mentioned above.

Also, during the short time intervals $T_{sh}$, voltages $V_1$ and V2 across the switching transistors 15 and 16, respectively, drop down to the level of the input voltage $V_{in}$. Therefore, the energy stored in transistor intrinsic capacitance ($CV^2/2$) and accordingly, turn-on transistor losses are reduced in comparison with the prior art converter of FIG. 1C and equal to same of the push-pull converter of FIG. 2. Assuming an average duty ratio of the switching transistor D=0.3, these losses calculated for the converter 10 of FIG. 3A, are twice less than same for the converter of FIG. 1C under all other conditions equivalent.

Figure 1A:
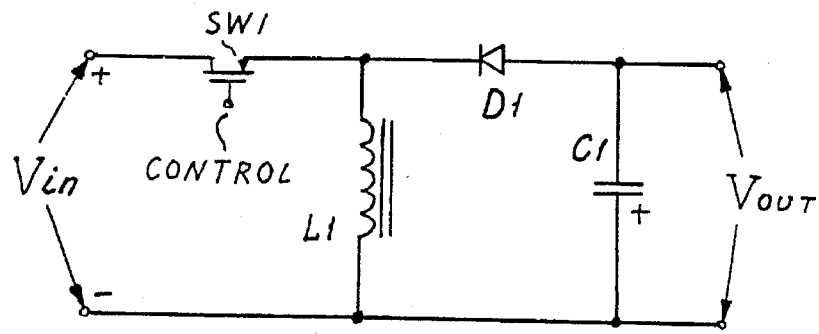
FIG. 1A (prior art) illustrates a schematic diagram of a non-isolated buck-boost converter.
Figure 1B:
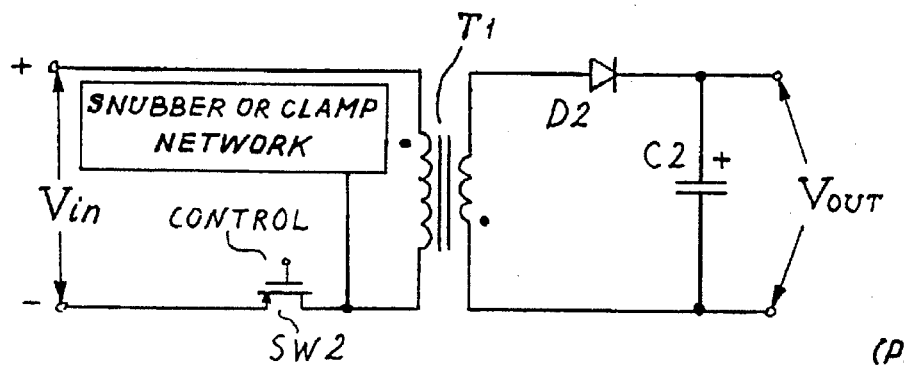
FIG. 1B (prior art) illustrates a schematic diagram of an isolated flyback converter.
Figure 1C:
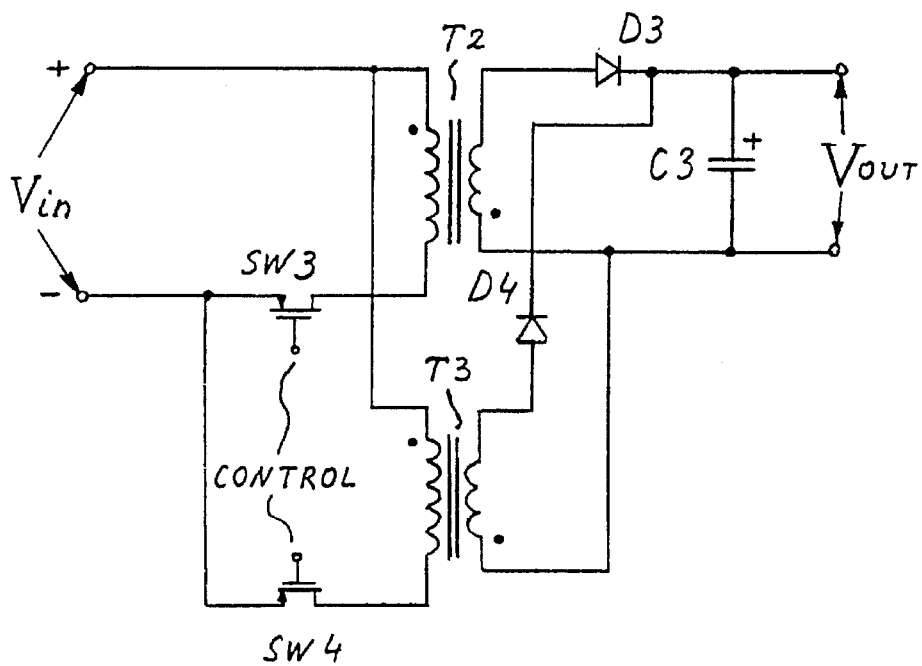
FIG. 1C (prior art) illustrates a schematic diagram of an interleaved flyback converter.
Figure 1D:
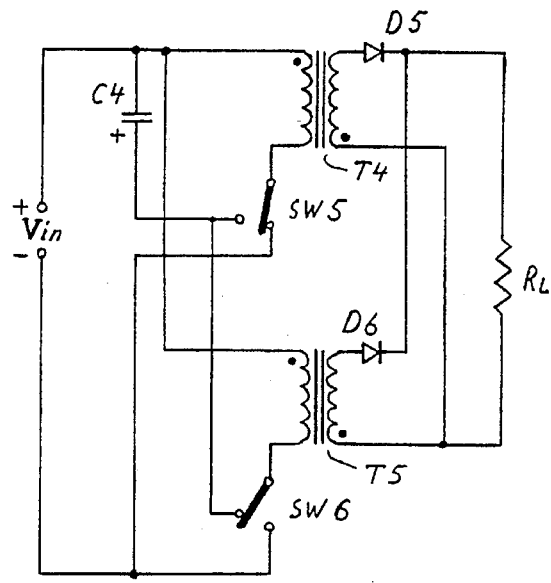
FIG. 1D (prior art) illustrates a schematic diagram of an interleaved flyback converter with active clamps.

Since the transistor switches $SW_3$ and $SW_4$ in the converter of FIG. 1C also operate with duty ratio below 50%, the transformers $T_2$ and $T_3$ in FIG. 1C have a discharge time that always exceeds the same of the corresponding transformers 13 and 14 in FIG. 3A. That is why it is easier to achieve the CCM at low load in the converter of FIG. 3A than in the converter of FIG. 1C under all other conditions equivalent.

Figure 4A:
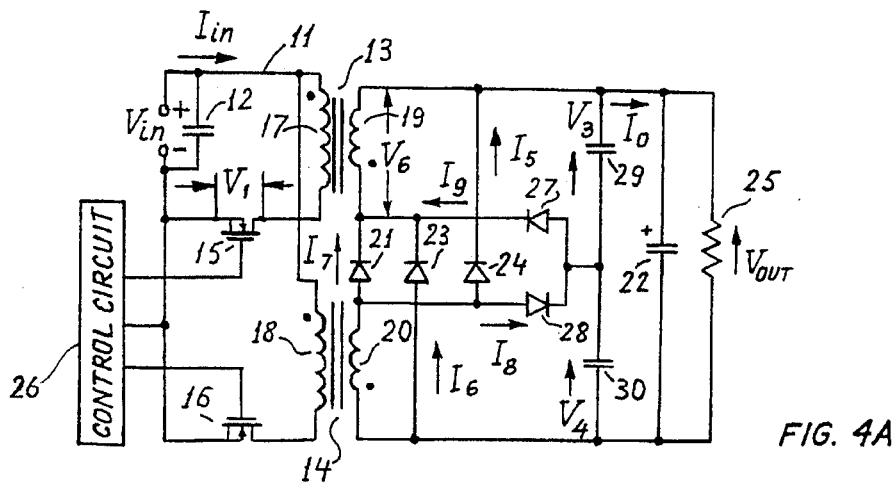
FIG. 4A illustrates a schematic diagram of a first further development of the converter of FIG. 3A.

A further development of the converter of FIG. 3A, according to the invention, is shown in FIG. 4A. In this schematic diagram, a secondary quasi-resonant snubber network is introduced comprising the secondary windings 19 and 20 as inductors, two series diodes 27 and 28 connected aiding and in parallel to the first catch diode 21 and two snubber capacitors 29 and 30, each connected between a common junction of the diodes 27 and 28 and the respective terminal of the output filter capacitor 22.

Figure 4B:
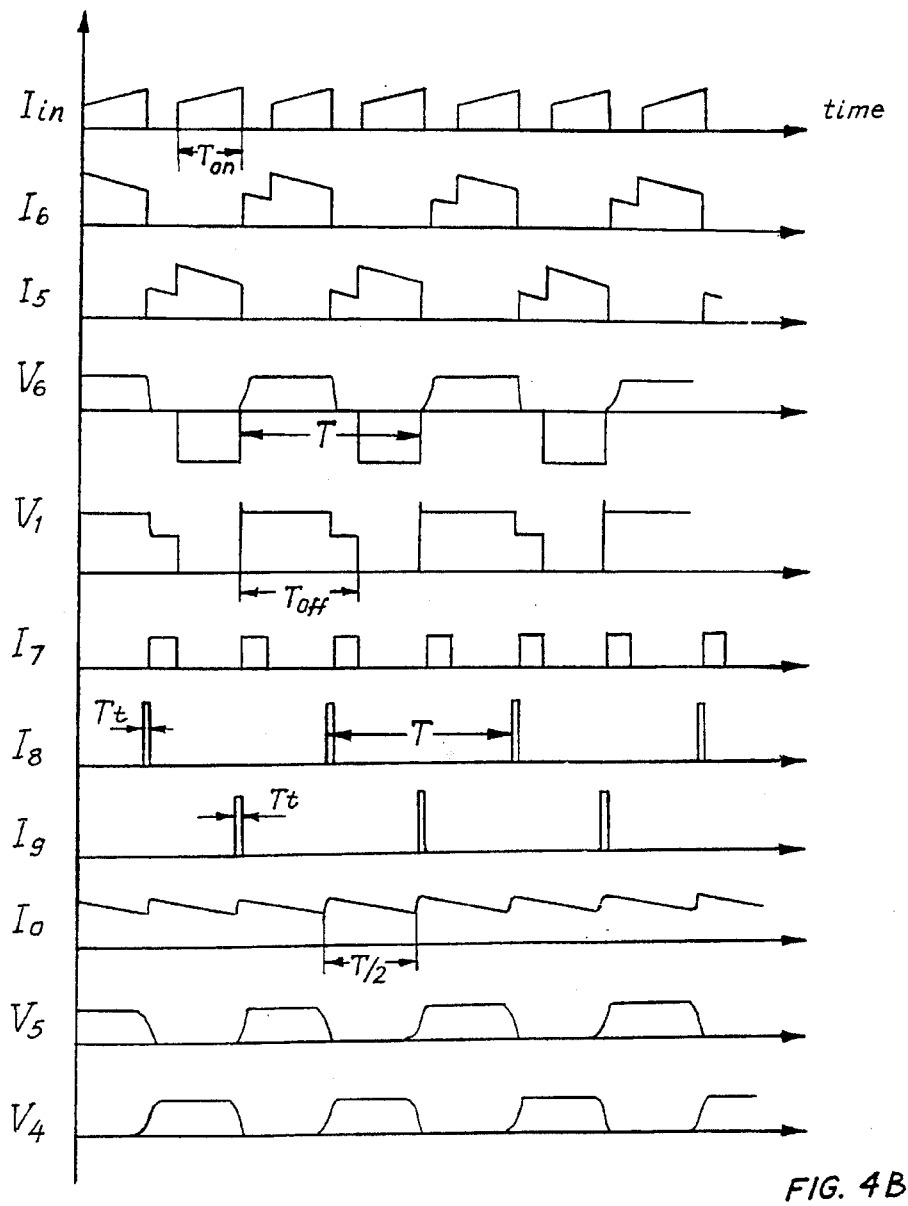
FIG. 4B illustrates waveforms in the converter of FIG. 4A.

In FIG. 4A, $V_3$ and $V_4$ designate voltages of the snubber capacitors 29 and 30; $I_8$ and $I_9$ designate currents in the snubber diodes 28 and 27 respectively. The values of the snubber capacitors 29 and 30 are chosen with a condition that the resonance frequency of the snubber network is above the converter switching frequency. As the sum of snubber capacitor voltages $V_3$ and $V_4$ is always equal to the output $V_{out}$ voltage:

$$V_{out}=V_3+V_4, \quad (3)$$

these voltages change between zero and $V_{out}$ during a transition interval $T_t$ (see waveforms in FIG. 4B). When the switching transistor 15 turns off, the secondary winding 19 generates a transient current $I_9$ via the diode 27, charging the capacitor 29 and discharging the capacitor 30. During the transition time $T_t$, the voltage $V_6$ across the secondary winding 19 corresponds to the voltage $V_3$ across the charged capacitor 29. Since $T_t \ll T$, currents in said capacitors during the $T_t$ interval do not change significantly. The voltage $V_6$ (see FIG. 4B) has a nearly linear edge, that is, the secondary winding 19 is shorted when transistor 15 turns off. Therefore, the voltage spike generated across the primary winding 17, is significantly damped. Likewise, the voltage spike generated across the primary winding 18 is damped when the switching transistor 16 turns off.

The secondary quasi-resonant snubber network is lossless and substantially relieves a primary snubber or clamp network (not shown in FIG. 3A-4A). Accordingly, converter efficiency is increased and the EMI level is decreased.

Figure 5:
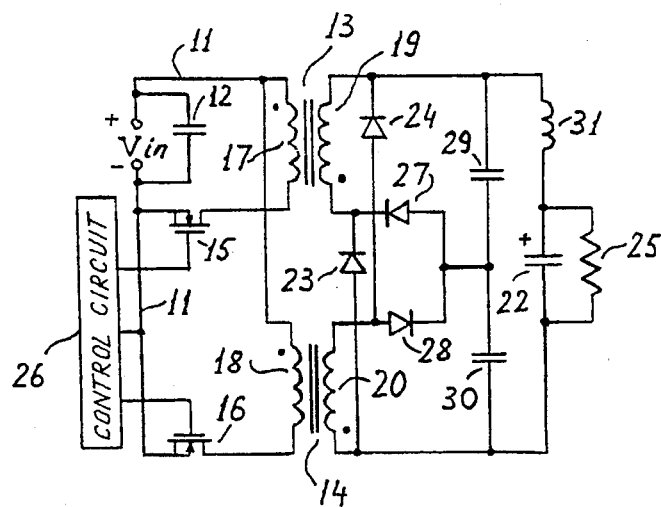
FIG. 5 illustrates a schematic diagram of a second further development of the converter of FIG. 3.

In FIG. 5, a version of the circuit diagram of FIG. 4A having less diodes is shown, wherein the snubber network diodes 27 and 28 connected in series perform functions of the catch diode 21 in FIG. 4A. Total diode conductive losses in this circuit diagram are increased and converter efficiency is slightly decreased. The schematic in FIG. 5 may be useful for higher output voltage.

In accordance with the invention disclosed in FIG. 5, by inserting a high frequency inductor 31 between a terminal of the snubber capacitor 29 or 30 and a terminal of the filter capacitor 22, the conductive EMI may be reduced. The snubber capacitors 29, 30 and the inductor 31 are high frequency components that suppress a high frequency noise. The output filter capacitor 22 is, in general, a capacitor of electrolytic type that by-passes the main harmonic of the current $I_0$.

Figure 6:
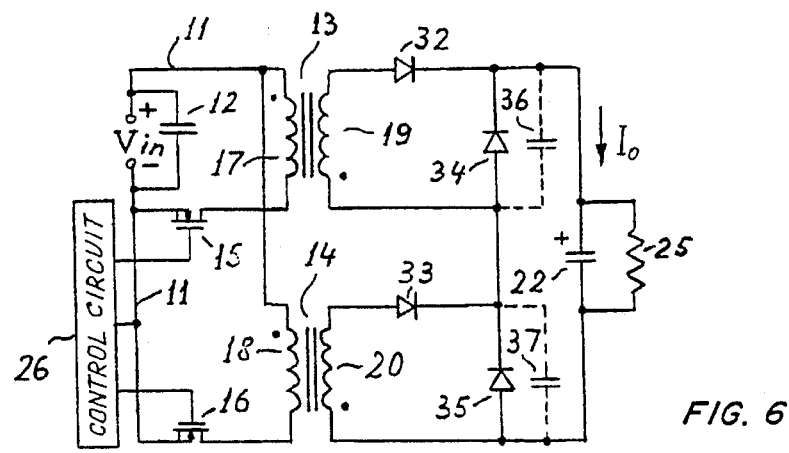
FIG. 6 illustrates a schematic diagram of an interleaved converter according to the second embodiment of the invention.

The second embodiment of the invention, shown in FIG. 6, is constructed preferably for high output voltage application. The difference between this embodiment and that, shown in FIG. 3A, relates to the construction of the schematic coupled to the secondary side of the converter transformers. In FIG. 6, numerals 32 and 33 designate a fourth and a fifth catch diodes, correspondingly, each connected in a first and a second series circuit, respectively, with secondary windings 19 and 20 of the corresponding transformers 13 and 14. The first and the second series circuits are connected in a third series circuit aiding each other. Free willing diodes 34, 35 are connected across the first and the second series circuits, correspondingly, and the output filter capacitor 22 is coupled in parallel to the third series circuit.

The manner of operation of the converter in FIG. 6 is similar to that of the converter in FIG. 3A. This operation is best understood as follows. When the transistor 15 turns off, the winding 19 generates a current via the catch diode 32. As this current exceeds a current flowing in the winding 20, the free willing diode 34 is back biased and the free willing diode 35 is conductive causing a short of the winding 20. In comparison with the circuit shown in FIG. 3A, the current $I_0$ in the circuit of FIG. 6 flows to the load 25 via two series diodes and therefore, converter efficiency suffers. However, the reverse voltage across the catch diodes 32 and 33 is much less that same voltage of the corresponding diodes 23 and 24 in the circuit of FIG. 3A.

A further improvement of the converter of FIG. 6, according to the invention, is achieved by connecting of snubber capacitors 36 and 37 across the free willing diodes 34 and 35, respectively, (shown by dotted lines). The manner of operation of the converter of FIG. 6 with these snubber capacitors and results thereof are like that in the converter of FIG. 4A. The converter of FIG. 6 is preferred for a high voltage load.

Figure 7:
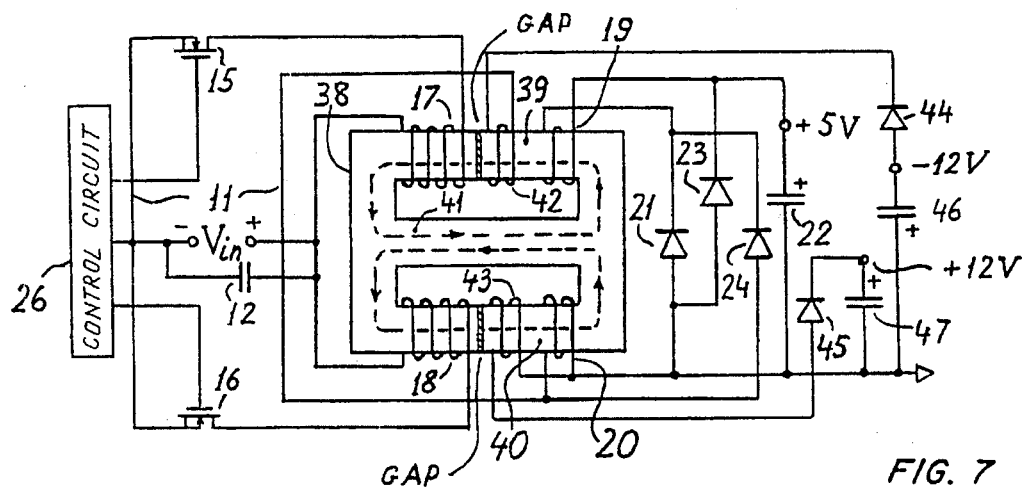
FIG. 7 illustrates a schematic diagram of the third embodiment of the interleaved converter according to the present invention.

A third embodiment of the invention, shown in FIG. 7, is realized by integration of the first and the second transformers provided with a common magnetic core 38. According to the invention, the magnetic core 38 comprises the first and the second gaped legs 39 and 40 and, at least, one third ungaped leg 41. On the first gaped leg 39, the primary winding 17 and the secondary winding 19 of the first flyback transformer are wound. On the second gaped leg 40, the primary winding 18 and the secondary winding 20 of the second flyback transformer are wound. The primary windings 17 and 18 are wound in such a way that they generate magnetic fluxes which cancel each other in the third ungaped leg 41. Peak value of the total flux in the center leg 41 corresponds to the maximum flux ripple in the gaped leg 39 or 40. Therefore, in FIG. 7, the cross section area of the center leg 41 can be significantly reduced. The converter of FIG. 7 comprises transformer means of much less volume and cost, especially when made with printed circuit board windings, than the corresponding converters with two separate transformers described above.

Also, FIG. 7 teaches an introduction of the invention into a low cost multioutput power supply. In the converter of FIG. 7, a main output, for instance, +5V output is constructed in accordance with the invention, and two auxiliary outputs, for instance −12V and +12V, are constructed by a conventional way. These two outputs are formed by auxiliary windings 42 and 43, auxiliary catch diodes 44 and 45 and auxiliary filter capacitors 46 and 47, correspondingly.

In summary, the flyback converters of the present invention attain the following desirable features: low output current ripple, reduced voltage stresses and switching losses, improved transfer characteristics and reduced volume of magnetic components.

The embodiments of the invention described above are intended to be exemplary and not limiting. Furthermore, it will be appreciated if the above teachings will be applied to others possible variations of the invention by those skilled in the art. Accordingly, the subject matter sought to be protected hereby should be extended to the subject matter defined in the claims and all equivalents thereof.

What is claimed is:

1. An interleaved DC to DC flyback converter comprising:

DC input supply lines;

an input capacitor connected to the DC input supply lines;

a first and a second flyback transformer means each having a primary winding and at least one secondary winding, each of said first and said secondary windings having a first and a second terminals;

a first and a second switching means controlled with 180° phase shift relative to each other for providing a regulated energy flow from the DC input supply lines, each of the first and the second switching means being coupled in a series circuit with the primary winding of the corresponding transformer means, each of said two series circuits being connected in parallel with the input capacitor;

a first catch rectifying means connected between the first and the second terminals of the secondary windings aiding each other;

an output filter capacitor having two terminals coupled with opposite terminals of said secondary windings;

a second catch rectifying means connected between the first terminals of the secondary windings;

a third catch rectifying means connected between the second terminals of the secondary windings; and a control circuit for driving alternately the first and the second switching means with a predetermined duty ratio.

2. The converter of claim 1, further comprising at least one auxiliary output built up by an auxiliary secondary winding of one of the first and the second flyback transformer means, an auxiliary catch rectifying means connected in series with said auxiliary secondary winding, and an auxiliary output filter capacitor coupled in parallel with said series circuit.

3. The converter of claim 1, wherein two series diodes are connected aiding and in parallel to the first catch rectifying means, said converter having at least one snubber capacitor connected between a common junction of the series diodes and one of said two terminals of the output filter capacitor.

4. The converter of claim 3, wherein there are two snubber capacitors being connected between said common junction of the series diodes and a corresponding one of said two terminals of the output filter capacitor.

5. The converter of claim 4, further comprising an inductor inserted in a junction between one of said snubber capacitors and said output filter capacitor.

6. The converter of claim 1, wherein the first and the second flyback transformer means are provided with a common magnetic core having a first and a second gaped legs on which the first and the second transformer means are respectively integrated, and at least one third ungaped leg in which magnetic fluxes of the first and the second legs cancel each other.

7. The converter of claim 1, wherein the first catch rectifying means are formed by two diodes connected in series, said converter having at least one snubber capacitor connected between a common junction of the series diodes and one of said two terminals of the output filter capacitor.

8. The converter of claim 7, wherein there are two snubber capacitors, each of said snubber capacitors being connected between said common junction of the series diodes and a corresponding one of said terminals of the output filter capacitor.

9. The converter of claim 8, further comprising an inductor inserted in a junction between one of said snubber capacitors and said output filter capacitor.

10. An interleaved DC to DC flyback converter comprising:

DC input supply lines;

an input capacitor connected to the DC input supply lines;

a first and a second flyback transformer means each having a primary winding and at least one secondary winding, each of said first and said secondary windings having a first and a second terminals;

a first and a second switching means controlled with 180° phase shift relative to each other for providing a regulated energy flow from the DC input supply lines, each of the first and the second switching means being coupled in a series circuit with the primary winding of the corresponding transformer means, each of said two series circuits being connected in parallel with the input capacitor;

a fourth and a fifth catch rectifying means each connected in a first and a second series circuit, respectively, with the secondary winding of the corresponding transformer means, said series circuits being coupled together aiding in a third series circuit;

a first and a second free willing rectifying means connected across the first and the second series circuits correspondingly;

an output filter capacitor coupled in parallel with the third series circuit; and a control circuit for driving alternately the first and the second switching means with a predetermined duty ratio.

11. The converter of claim 10, further comprising at least one auxiliary output built up by an auxiliary secondary winding of one of the first and the second flyback transformer means, an auxiliary catch rectifying means connected in series with said auxiliary secondary winding, and an auxiliary output filter capacitor coupled in parallel with said series circuit.

12. The converter of claim 10, further comprising at least one snubber capacitor connected across one of the free willing rectifying means.

13. The converter of claim 12, comprising two snubber capacitors, each of said snubber capacitors being connected across a respective one of the free willing rectifying means.

14. The converter of claim 13, wherein an inductor inserted in a junction between one of said snubber capacitors and said output filter capacitor.

15. The converter of claim 10 wherein, the first and the second transformer means are provided with a common magnetic core having a first and a second gaped legs on which the first and the second transformer means are respectively integrated, and at least one third ungaped leg in which magnetic fluxes of the first and the second legs cancel each other.

* * * * *